(12) United States Patent
Kowalkowski et al.

(10) Patent No.: US 8,607,625 B2
(45) Date of Patent: Dec. 17, 2013

(54) SERVICE TEST FOR EXHAUST GAS TREATMENT SYSTEM

(75) Inventors: Janean E. Kowalkowski, Northville, MI (US); John Coppola, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 19 days.

(21) Appl. No.: 13/468,327

(22) Filed: May 10, 2012

(65) Prior Publication Data

US 2013/0298655 A1    Nov. 14, 2013

(51) Int. Cl.
*G01M 15/10* (2006.01)

(52) U.S. Cl.
USPC ...................................... 73/114.75

(58) Field of Classification Search
USPC ...................................... 73/114.75
See application file for complete search history.

(56) References Cited

U.S. PATENT DOCUMENTS

| 6,363,771 | B1 * | 4/2002 | Liang et al. | 73/23.31 |
| 8,225,595 | B2 * | 7/2012 | Garimella et al. | 60/277 |
| 8,281,578 | B2 * | 10/2012 | Upadhyay et al. | 60/301 |
| 8,286,419 | B2 * | 10/2012 | Levijoki et al. | 60/295 |
| 8,353,202 | B2 * | 1/2013 | Thompson et al. | 73/114.75 |
| 8,375,700 | B2 * | 2/2013 | Sisken et al. | 60/277 |
| 2012/0060469 | A1 * | 3/2012 | Gady et al. | 60/273 |
| 2013/0139489 | A1 * | 6/2013 | Liu et al. | 60/276 |

* cited by examiner

*Primary Examiner* — Freddie Kirkland, III
(74) *Attorney, Agent, or Firm* — Cantor Colburn LLP

(57) ABSTRACT

A service procedure to test the SCR device involves turning on an upstream and downstream SCR NOx sensor, turning off an $NH_3$ injector, running the engine until enough upstream NOx mass has been generated by the engine to deplete any $NH_3$ load remaining in the SCR device, determining the operational status of the NOx sensors as follows:

if 1−downstream NOx ppm/upstream NOx ppm=approx. 0;
then the downstream NOx sensor is reading the same as the upstream NOx sensor and the downstream NOx sensor is determined to be good and the SCR device may have to be replaced; and if 1−downstream NOx ppm/upstream NOx ppm>approx. 0;
then the downstream NOx sensor is reading high and the downstream NOx sensor is determined to be bad and downstream NOx sensor may have to be replaced.

5 Claims, 2 Drawing Sheets

SERVICE TEST FOR EXHAUST GAS TREATMENT SYSTEM

FIELD OF THE INVENTION

Exemplary embodiments of the invention relate to exhaust gas treatment systems for internal combustion engines and, more particularly, to a service test for an exhaust gas treatment system for determining the proper operation of the Selective Catalyst Reduction ("SCR") catalyst device and associated sensors.

BACKGROUND

The exhaust gas emitted from an internal combustion engine, particularly a diesel engine, is a heterogeneous mixture that contains gaseous emissions such as, but not limited to, carbon monoxide ("CO"), unburned hydrocarbons ("HC") and oxides of nitrogen ("$NO_x$") as well as condensed phase materials (liquids and solids) that constitute particulate matter ("PM"). Catalyst compositions, typically disposed on catalyst supports or substrates, are provided in an engine exhaust system to convert certain, or all of these exhaust constituents into non-regulated exhaust gas components.

A technology that has been developed to reduce the levels of $NO_x$ emissions in lean-burn engines (ex. diesel engines) that burn fuel in excess oxygen includes a Selective Catalytic Reduction ("SCR") device. The SCR catalyst composition applied to the SCR device may contain a zeolite and one or more base metal components such as iron ("Fe"), cobalt ("Co"), copper ("Cu") or vanadium ("V") which can operate efficiently to reduce $NO_x$ constituents in the exhaust gas in the presence of a reductant such as ammonia ('$NH_3$"). When used in conjunction with a diesel engine the reductant is commonly referred to as a Diesel Emissions Fluid or ("DEF") and is injected at a location upstream of the SCR device during operation of the engine. For example, when the proper amount of $NH_3$ is available in the SCR device under the proper conditions, the $NH_3$ reacts with the NOx in the presence of the SCR catalyst to reduce the NOx emissions to, for example, nitrogen. Reductant storage systems are provided to supply any needed reductant to the SCR device.

NOx sensors are typically placed both upstream and downstream of the SCR device to determine the efficiency of NOx conversion by the SCR catalyst composition. It is important that the SCR device maintains a high level of NOx conversion in order to maintain compliance with emission regulations. As such, when various exhaust system controllers determine, through signal communication with the NOx sensors that the SCR conversion efficiency of the SCR device may not be converting NOx at a desired level of efficiency a code, or other type of warning, signals the operator that service may be necessary. Due to the high cost of replacement, it is important that appropriate diagnostic tests be performed before the SCR device is replaced.

SUMMARY OF THE INVENTION

In an exemplary embodiment of the invention a service device operable to test the SCR device of an exhaust gas treatment system of an internal combustion engine comprises a controller that includes sub modules containing logic that receive various inputs from the engine and the exhaust system and an engine controller; first sub module that determines the operational status of a NOx sensor that is upstream and a NOx sensor that is downstream of the SCR device, such as on/off and-or hi/low; a second sub module that determines the on/off status of a $NH_3$ injector upstream of the SCR device, such that when the first sub module indicates that both upstream and downstream NOx sensors are on and simultaneously that $NH_3$ injector is on the second sub module will issue a signal to the $NH_3$ injector to turn off; a validation module that monitors the engine until enough upstream NOx mass has been generated by the engine, based on engine operating parameters (combustion air in, fuel, temperature, etc.) to deplete and $NH_3$ load remaining in the SCR device and once the appropriate NOx mass has passed through the SCR device to deplete the $NH_3$ load it determines the operational status of the NOx sensors as follows:

if the 1−downstream NOx ppm/upstream NOx ppm=approx. 0;

then the downstream NOx sensor is reading the same as the upstream NOx sensor and the downstream NOx sensor is determined to be good and the SCR device may have to be investigated for possible failure and replacement; and if the 1−downstream NOx ppm/upstream NOx ppm>approx. 0;

then the downstream NOx sensor is reading high and the downstream NOx sensor is determined to be bad and NOx sensor may have to be investigated for possible failure and replacement.

The above features and advantages, and other features and advantages of the invention are readily apparent from the following detailed description of the invention when taken in connection with the accompanying drawings.

BRIEF DESCRIPTION OF THE DRAWINGS

Other objects, features advantages and details appear, by way of example only, in the following detailed description of the embodiments, the detailed description referring to the drawings in which.

DESCRIPTION OF THE EMBODIMENTS

Figure 1:
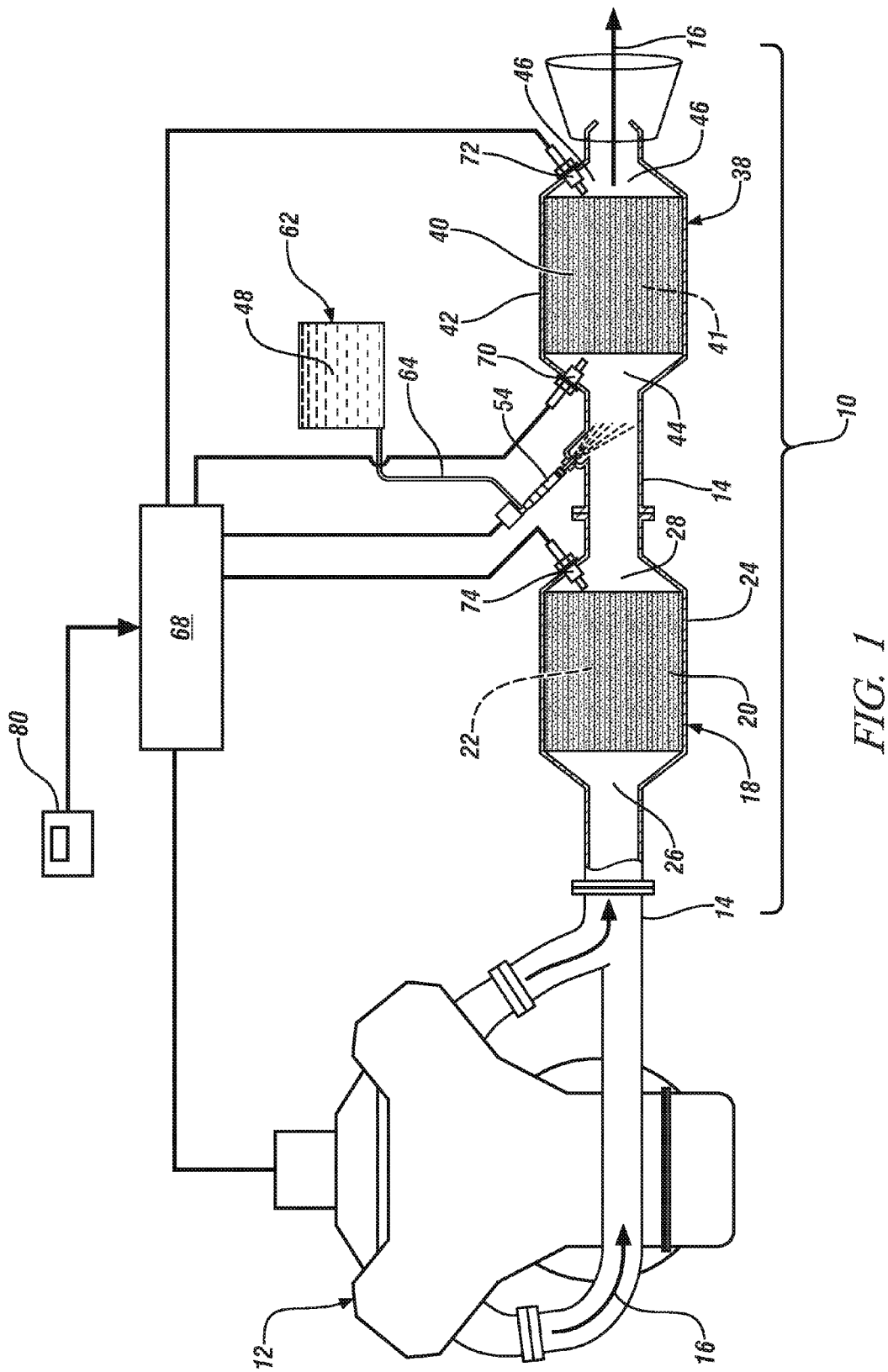
FIG. 1 is a schematic view of an exhaust gas treatment system for an internal combustion engine.

The following description is merely exemplary in nature and is not intended to limit the present disclosure, its application or uses. It should be understood that throughout the drawings, corresponding reference numerals indicate like or corresponding parts and features. As used herein, the term module refers to an application specific integrated circuit (ASIC), an electronic circuit, a processor (shared, dedicated or group) and memory that executes one or more software or firmware programs, a combinational logic circuit, and/or other suitable components that provide the described functionality.

Referring now to FIG. 1, an exemplary embodiment of the invention is directed to an exhaust gas treatment system, referred to generally as 10, for the reduction of regulated exhaust gas constituents of an internal combustion engine 12. It is appreciated that the internal combustion engine 12 may include, but is not limited to diesel engine systems, gasoline engine systems and homogeneous charge compression ignition engine systems.

The exhaust gas treatment system includes an exhaust gas conduit 14, which may comprise several segments that function to transport exhaust gas 16 from the internal combustion engine 12 to the various exhaust treatment devices of the exhaust gas treatment system 10. The exhaust treatment devices may include an Oxidation Catalyst ("OC") device 18. In an exemplary embodiment, the OC device 18 includes a flow-through metal or ceramic monolith substrate 20 ("substrate") that is packaged in a rigid shell or canister 24 between an inlet 26 and an outlet 28 that are in fluid communication with the exhaust gas conduit 14 and are configured to facilitate the flow of exhaust gas 16 therethrough. The substrate 20 has an oxidation catalyst compound 22 disposed thereon. The oxidation catalyst compound may be applied as a wash coat and may contain platinum group metals such as platinum (Pt), palladium (Pd), rhodium (Rh) or other suitable oxidizing catalysts, or combination thereof. The OC device 18 is useful in treating unburned gaseous and non-volatile HC and CO emitted from the engine as part of the exhaust gas 16 which are oxidized to form carbon dioxide and water.

In an exemplary embodiment, a Selective Catalytic Reduction ("SCR") device 38 is disposed downstream of the OC device 18. In a manner similar to the OC device, the SCR device 38 may include a flow-through ceramic or metal monolith substrate ("substrate") 40 that is packaged in a rigid shell or canister 42 having an inlet 44 and an outlet 46 in fluid communication with exhaust gas conduit 14 and configured to facilitate the flow of exhaust gas 16 therethrough. The substrate 40 has an SCR catalyst composition 41 applied thereto. The SCR catalyst composition preferably contains a zeolite and one or more base metal components such as iron ("Fe"), cobalt ("Co"), copper ("Cu") or vanadium which can operate efficiently to reduce $NO_x$ constituents in the exhaust gas 16 in the presence of a reductant such as ammonia ('$NH_3$") and at temperatures that are in the range of 200° C. and above.

In an exemplary embodiment, disposed upstream of the SCR device 38, in fluid communication with the exhaust gas 16 in the exhaust gas conduit 14, is an $NH_3$/reductant injector 54. The $NH_3$ is in the form of a reductant such as gaseous ammonia or liquid urea and when used in conjunction with a diesel engine the reductant is commonly referred to as a Diesel Emissions Fluid or ("DEF") 48 and is injected at a location upstream of the SCR device 38 during operation of the engine 12. The $NH_3$/reductant injector 54 is in fluid communication with DEF 48 in a supply tank 62 through supply conduit 64.

A controller such as a powertrain or a vehicle controller 68 is operably connected to, and monitors, the exhaust gas treatment system 10 based on sensed and/or modeled data and further through signal communication with a number of sensors such as NOx sensors 70 and 72 and temperature sensor 74 which monitor the NOx concentrations and temperature near the inlet 44 and outlet 46 of the SCR device 38. As used herein the term controller may include an application specific integrated circuit (ASIC), an electronic circuit, a processor (shared, dedicated or group) and memory that executes one or more software or firmware programs, a combinational logic circuit, and/or other suitable components that provide the described functionality.

Based on various measured parameters including those from NOx sensors 70 and 72, the controller 68 is configured to operate the $NH_3$/reductant injector 54 to supply DEF 48 to the exhaust gas conduit 14 at the appropriate times and temperatures to reduce the NOx emitted from the exhaust gas treatment system 10. During normal operation the comparative signals received from NOx sensor 70, upstream of the SCR device 38 should read high and from NOx sensor 72, downstream of the SCR device 38 should read low, indicating the appropriate NOx conversion is taking place in the device. This is the manner in which the required SCR efficiency monitors determine the efficiency, and therefore condition of the SCR device. If, however, either one of the NOx sensors 70, 72 are providing inaccurate readings to the controller 68, then the SCR efficiency monitor test can falsely indicate a malfunctioning SCR device 38, suggesting the need for repair.

Figure 2:
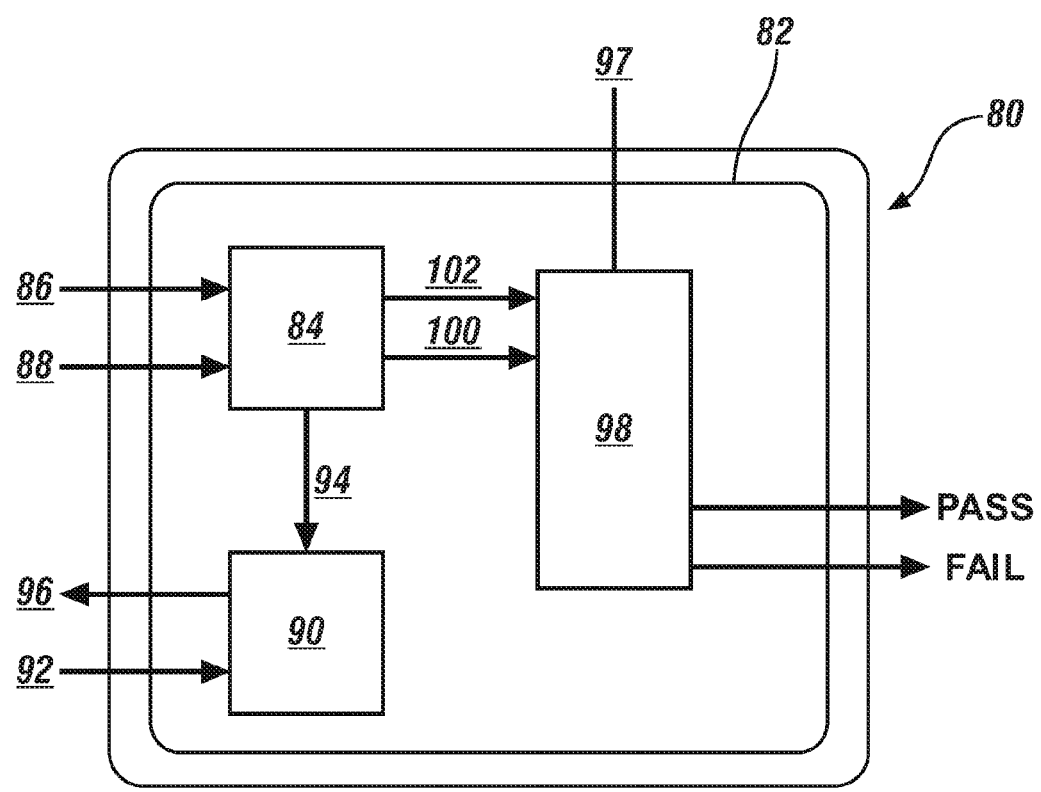
FIG. 2 is a dataflow diagram illustrating a service device control system in accordance with an exemplary embodiment.

A service device 80 is utilized by a service technician to test the exhaust gas treatment system 10 when the vehicle is presented for SCR device related service. The service device 80 utilizes a controller 82 that includes sub modules containing logic that receive various inputs from the engine 12 and the exhaust system 10. As illustrated in FIG. 2, the controller 82 may include a first sub module 84 that determines the operational status of the NOx sensors 86, 88 such as on/off and-or hi/low. A second sub module 90 determines the status of the DEF injection 54. When the first sub module 84 indicates at 94 that both upstream and downstream NOx sensors 70, 72, respectively are on, and second sub module 90 simultaneously receives a signal at 92 that DEF dosing is in progress, the second sub module will issue a signal 96 to the DEF injector 54 (ex. through controller 60) to turn off DEF dosing.

Once DEF dosing has been turned off by second sub module 90 sensor validation module 98 will monitor engine 12 until enough upstream NOx mass has been generated by the engine based on engine operating parameters (combustion air in, fuel, temperature, etc.) to deplete the DEF load remaining on the substrate 40 of the SCR device 38. This time will be determined by the type of engine and may be input by a service technician or determined independently by the service device 80 at 97 (i.e. from the controller 68). Once the appropriate NOx mass has passed through the SCR device to deplete the DEF load, sub module 84 determines the operational status of the NOx sensors 70, 72.

If 1−downstream NOx ppm/upstream NOx ppm=approx. 0

Then the downstream NOx sensor 72 is reading the same 100 as the upstream NOx sensor 70 and the downstream NOx sensor is determined to be good (i.e. PASS). This suggests that the SCR device may have to be investigated for possible failure and replacement.

If 1−downstream NOx ppm/upstream NOx ppm>approx. 0

Then the downstream NOx sensor 72 is reading high 102 and the downstream NOx sensor is determined to be bad (i.e. FAIL). This suggests that the downstream 72 sensor should be replaced and the test run again. Replacement of the costly SCR device 38 may be avoided. As can be appreciated, the sub modules described can be combined and/or further subdivided to provide similar estimations and commands as deemed appropriate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed but that the invention will include all embodiments falling within the scope of the present application.

What is claimed is:
1. A service device operable to test the SCR device of an exhaust gas treatment system of an internal combustion engine comprising:
  a controller that includes sub modules containing logic that receive various inputs from the engine, the exhaust system and an engine controller;

a first sub module that determines an operational status of a NOx sensor that is upstream and a NOx sensor that is downstream of the SCR device, wherein the operational status comprises at least one of an on/off operational status and a hi/low operational status, a second sub module that determines the on/off status a $NH_3$ injector upstream of the SCR device, such that when the first sub module indicates at that both upstream and downstream NOx sensors are on and simultaneously that $NH_3$ injector is on the second sub module is configured to issue a signal to the $NH_3$ injector to turn off;

a validation module that monitors the engine until enough upstream NOx mass has been generated by the engine, based on engine operating parameters (combustion air in, fuel, temperature,) to deplete and $NH_3$ load remaining in the SCR device and once the appropriate NOx mass has passed through the SCR device to deplete the $NH_3$ load, the validation module is configured to determine the operational status of the NOx sensors as follows:

if 1−downstream NOx ppm/upstream NOx ppm=approx. 0;

then the downstream NOx sensor is reading the same as the upstream NOx sensor and the downstream NOx sensor is determined to be good and the SCR device may have to be investigated for possible failure and replacement; and if 1−downstream NOx ppm/upstream NOx ppm>approx. 0;

then the downstream NOx sensor is reading high and the downstream NOx sensor is determined to be bad and NOx sensor may have to be investigated for possible failure and replacement.

2. The service device of claim 1, wherein the NOx mass to deplete the $NH_3$ load is be is adjustable and configured to be manually input by a service technician, the NOx mass adjustable based on the type of engine.

3. The service device of claim 1, wherein the NOx mass to deplete the $NH_3$ load is adjustable and configured to be determined by the service device from connection to the engine controller.

4. A service procedure to test the SCR device of an exhaust gas treatment system of an internal combustion engine comprising:

turning on an upstream and a downstream SCR NOx sensor;

turning off a $NH_3$ injector;

running the internal combustion engine until enough upstream NOx mass has been generated by the engine, based on engine operating parameters (combustion air in, fuel, temperature) to deplete any $NH_3$ load remaining in the SCR device;

determining the operational status of the NOx sensors as follows:

if 1−downstream NOx ppm/upstream NOx ppm=approx. 0;

then the downstream NOx sensor is reading the same as the upstream NOx sensor and the downstream NOx sensor is determined to be good and the SCR device may have to be investigated for possible failure and replacement; and if 1−downstream NOx ppm/upstream NOx ppm>approx. 0;

then the downstream NOx sensor is reading high and the downstream NOx sensor is determined to be bad and NOx sensor may have to be investigated for possible failure and replacement.

5. The service procedure of claim 4, wherein the NOx mass to deplete the $NH_3$ load is determined by the type of engine.

\* \* \* \* \*